United States Patent [19]

Cadwallader

[11] 4,223,632
[45] Sep. 23, 1980

[54] APPARATUS FOR MAKING SELF-LOCKING FASTENERS WITH A PRESSURE ROLLED THERMOPLASTIC PATCH

[75] Inventor: James W. Cadwallader, Lansdale, Pa.

[73] Assignee: SPS Technologies, Inc., Jenkintown, Pa.

[21] Appl. No.: 916,612

[22] Filed: Jun. 19, 1978

Related U.S. Application Data

[60] Division of Ser. No. 828,399, Aug. 29, 1977, Pat. No. 4,132,815, which is a continuation of Ser. No. 639,324, Dec. 10, 1975, abandoned.

[51] Int. Cl.$^2$ ............................................. B05C 19/00
[52] U.S. Cl. ...................................... 118/58; 118/112; 118/114; 118/308; 427/195; 427/359
[58] Field of Search .......................... 151/7; 10/10 P; 118/112, 114, 58, 308; 427/195, 355, 359, 365

[56] References Cited

U.S. PATENT DOCUMENTS

| | | | |
|---|---|---|---|
| 2,738,713 | 3/1956 | Buczkowski et al. | 118/114 X |
| 2,789,926 | 4/1957 | Finholt et al. | 118/308 X |
| 3,133,312 | 5/1964 | Harris et al. | 118/112 X |
| 3,167,442 | 1/1965 | Brooks | 427/194 |
| 3,310,431 | 3/1967 | Loose | 118/308 X |
| 3,385,722 | 5/1968 | Weaver et al. | 427/195 |
| 3,416,492 | 12/1968 | Greenleaf | 118/308 X |
| 3,498,352 | 3/1970 | Duffy | 118/308 UX |
| 3,634,577 | 1/1972 | Kull | 427/195 X |
| 3,854,975 | 12/1974 | Brenneman et al. | 118/114 X |
| 3,958,039 | 5/1976 | Yabuki et al. | 427/194 X |

Primary Examiner—Shrive P. Beck
Attorney, Agent, or Firm—Aaron Nerenberg

[57] ABSTRACT

A self-locking threaded fastener of the type having a resilient thermoplastic resin patch bonded to the thread surface and a method and apparatus for making such fasteners are disclosed. The fastener is heated to a temperature in excess of the plastic melting temperature by induction heating coils and powder is thereupon deposited on the surface of the threads over a predetermined area by gravity feed. Rolling pressure is then applied to the plastic material to form the patch, packing the material between the thread flanks and confining the height of the patch to a controlled radial height above the thread crests. The controlled radial height of the patch is within the normal envelope of the basic major diameter of the fastener thread.

5 Claims, 9 Drawing Figures

U.S. Patent  Sep. 23, 1980  Sheet 1 of 2  4,223,632
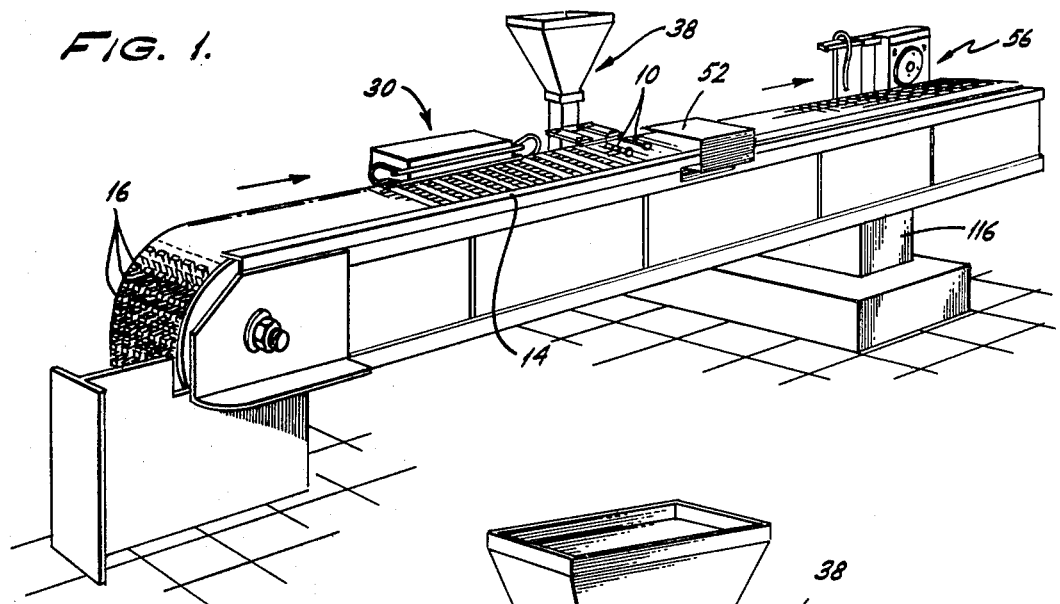
FIG. 1.
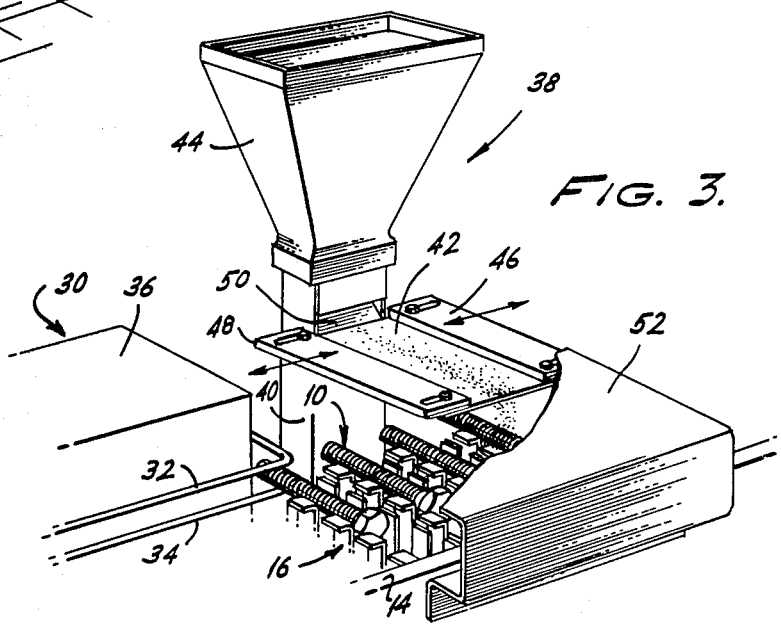
FIG. 2.
FIG. 3.
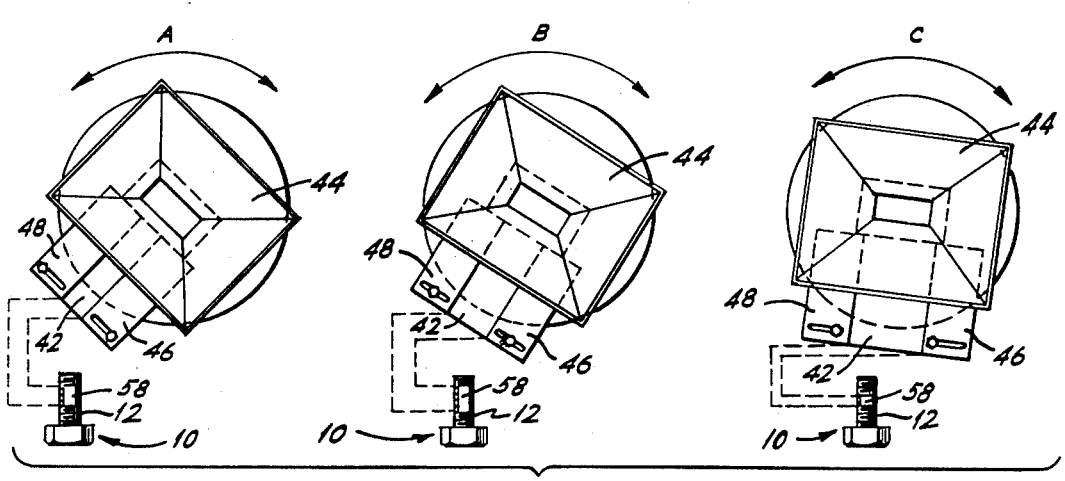
FIG. 4.

APPARATUS FOR MAKING SELF-LOCKING FASTENERS WITH A PRESSURE ROLLED THERMOPLASTIC PATCH

This is a divisional of application Ser. No. 828,399, filed Aug. 29, 1977 now U.S. Pat. No. 4,132,815, which is a continuation of Ser. No. 639,324 filed Dec. 10, 1975 and now abandoned.

BACKGROUND OF THE INVENTION

This invention relates generally to the field of nut and bolt locks and more particularly to a self-locking fastener with a pressure-rolled resilient, deformable plastic patch bonded to the fastener thread surface.

Self-locking threaded fasteners of the type having a locking patch of thermoplastic resin bonded to the thread surfaces have found wide commercial application. This broad demand requires a manufacturing process for high volume production in a rapid and economical manner while maintaining high quality standards. Some important requirements for self-locking fasteners of the type described include sufficient adhesion between the plastic patch and the fastener thread surface, consistent patch material distribution, and controlled patch height. These qualities produce more consistent torque properties than fasteners in which these parameters are less accurately controlled. Inherent in the above requirements is the need to control the dimensional characteristics of the plastic patch in order to produce a uniform patch size and shape for repeatable fastener torque performance. Previous attempts at forming a free-form liquid pool of melted thermoplastic resin on the thread surface of a fastener, such as disclosed in U.S. Pat. No. 3,294,139 to Preziosi and 3,498,352 to Duffy, have certain inherent disadvantages. Included among these disadvantages are difficulty in confining the plastic patch to a definite and predictable configuration, localized buildup of excess patch material which can be easily sheared off, and difficulty in producing a sufficient and predictable amount of adhesion between the plastic patch and the thread surface. Shearing of the material occurs when the fastener containing the plastic patch is engaged in a mating thread causing loosely bonded particles to separate from the threaded surface and finally settle in the workpiece. Examination of fasteners which have been produced by the processes described in the above-noted patents under actual commercial conditions reveal wide variations in the size and shape of the plastic patches, many having an uneven, lumpy surface, or even a "spattered" appearance, with portions of the resin being in the form of small droplets separate from the main plastic body. Any such disparities in physical properties result in corresponding performance disparities, such as unpredictable locking torque values, decreased reusability and possible contamination of the environment in which the locking fastener is used due to the shearing off of excess patch material. Attempts have been made to confine the size and shape of the plastic locking patch, such as disclosed in U.S. Pat. Nos. 3,634,577 to Kull and 3,787,222 to Duffy, but the methods disclosed therein and the resulting locking fasteners produced thereby are not completely satisfactory. Either the process is relatively expensive, such as in the case of the Kull process which requires the use of matching molds or dies brought into contact with the threaded fastener to constrain the free flow of fused plastic material, or the resulting locking fastener does not produce a repeatable, predictable and sufficient amount of locking torque for all applications. For example, Kull's plastic patch material is confined to a height below the thread crests and thus forms an interrupted patch, which is effectively a series of individual patches between thread flanks. Duffy's patch material, on the other hand, extends an uncontrolled distance above the thread crests at the central line of the patch.

SUMMARY OF THE INVENTION

Accordingly, it is a general purpose and object of the present invention to provide a novel apparatus and method for producing a threaded fastener having a locking patch of thermoplastic resin bonded to the thread surface in a rapid, economical, simple and reliable manner. It is a further object to provide a threaded fastener having a locking patch formed thereon of variable yet confined proportions for providing more predictable and repeatable locking torques, greater reusability of the locking fastener and for reducing contamination of the surrounding environment due to shearing off of excess material from the locking patch. It is yet another object to confine the maximum radial height of the plastic patch a controlled distance above the thread crests to the basic major diameter of the fastener thread by the application of rolling pressure thereto. It is still a further object of the present invention to provide more consistent patch material distribution by the application of rolling pressure to the plastic patch. It is yet another object of the present invention to provide increased adhesion of the thermoplastic resin to the fastener thread surface by the application of rolling pressure to the plastic patch.

These and other objects are accomplished according to the present invention by a self-locking fastener of the type including external threads, each having a root, a crest and a flank therebetween, and having a resilient, deformable patch of thermoplastic material applied in powder form and fusion bonded to the thread surface over a preselected circumferential extent less than 180°. The thermoplastic material is subjected to rolling pressure forcing the material to a controlled radial height above the thread crests.

A method for making such fasteners includes the steps of heating the external thread surface to a temperature at least equal to the melting temperature of the thermoplastic material; depositing the material in powder form on the heated external thread surface over a preselected circumferential extent less than 180° thereby fusion bonding the material to the external thread surface; and applying rolling pressure to the material to form the patch, whereby the material is forced to the controlled radial height above the thread crests.

BRIEF DESCRIPTION OF THE DRAWINGS

FIG. 1 is a perspective view of apparatus for producing a patch type locking fastener in accordance with the present invention;

FIG. 2 is an elevation view of a magnetic fixture shown in FIG. 1;

FIG. 3 is an enlarged perspective view of the heating and powder dispensing apparatus shown in FIG. 1;

FIG. 4 is a plan view of the powder dispensing apparatus shown in three positions, A, B and C;

DESCRIPTION OF THE PREFERRED EMBODIMENT

Figure 8:
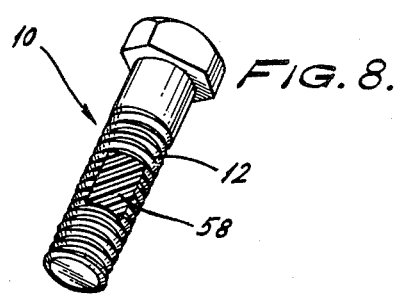
FIG. 8 is a perspective view of a fastener with the formed plastic patch after pressure rolling.
Figure 9:
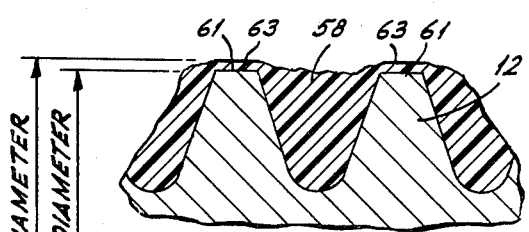
FIG. 9 is an enlarged fragmentary sectional view taken on the line 9—9 of FIG. 7 showing the distribution of the plastic material on the fastener threads at approximately the center of the patch.

Referring to FIGS. 1–7, a preferred embodiment of the apparatus for practicing the present invention is shown. FIGS. 8 and 9 illustrate the resulting locking fastener produced. A fastener 10 having a threaded shank 12 is shown carried on a conveyor 14. The process will be described with reference to a single fastener, but it should be understood that the apparatus will accommodate, successively, a large number of fasteners in an assembly line manner. The fastener is prepared for application of a thermoplastic resin in powder form by first being degreased to remove any oil and grease in the threads and body of the fastener and is then mechanically cleaned, such as by wheelabrating, to provide a substantially clean surface free of foreign material. Wheelabrating is a well known mechanical agitation process generally used throughout the fastener industry for removing extraneous material from fasteners. Fastener 10 is then loaded onto conveyor 14 at one end in some suitable manner, either manually or automatically by means not shown, by placing the fastener on one row of magnetic fixtures 16 transverse to the longitudinal axis of conveyor 14. As shown in FIG. 2, each fixture 16 includes a pair of members 18 and 20 fixed to a base 22. The members and base are all made of a magnetizable material such as sheet steel. A permanent magnet 24 is secured between members 18 and 20 in some suitable manner, such as by bolt 26 and nut 28. The top portion of member 20 is configured to accept fastener 10 thereon in such a manner that it bears securely against vertical member 18 for transportation through the various stations of the apparatus. Member 20 is preferably horizontally disposed on the top surface in order to allow fastener 10 to be mechanically knocked off the fixture at the end of the process, as will be more fully described hereinafter. FIG. 3 shows the tip end of threaded shank 12 extending beyond the outermost one of a row of fixtures 16 so that fastener 10 is in proper position to receive the plastic powder on its surface. Conveyor 14 is driven at a variable range of speeds from approximately 5 to 24 feet per minute by suitable conventional driving means (not shown).

Figure 5:
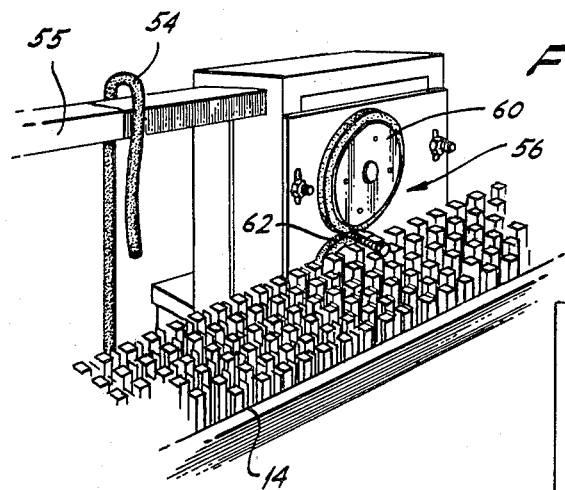
FIG. 5 is an enlarged perspective view of the water spray and pressure rolling apparatus shown in FIG. 1.
Figure 7:
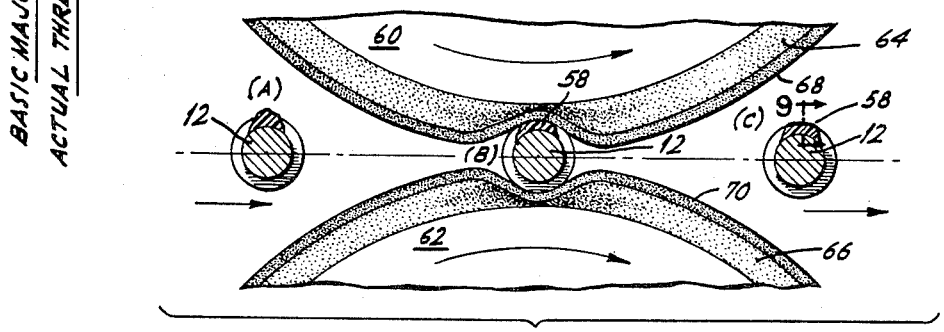
FIG. 7 is an enlarged front elevation view of the pressure rolling apparatus of FIGS. 1 and 5 including the composite resilient material, showing a typical fastener with plastic material on its surface before, during and after rolling.

Fastener 10 is first moved to heating apparatus 30 where threaded shank 12, which is to receive the thermoplastic material, is heated by passing it between a top 32 and a bottom 34 inductive heating coil, raising the surface temperature to between approximately 475° F. to 525° F., which temperatures are above the melting temperature of the thermoplastic material. It should be understood that the temperature of the interior material of the bolt will vary according to the bolt diameter, but conduction of heat from the surface to the interior will cause the material adjacent the surface to be at approximately the same temperature as the surface. In the present apparatus, coils 32 and 34 are approximately 18" long and are powered by a 15 kw high frequency Lapel induction heater 36. The speed of conveyor 14 and energy imparted to coils 32 and 34 are selected to cause the fastener to become heated to its core, so that the internally heated metal acts as a heat reservoir to supply heat to the fastener surface after it leaves the coils. This continuing source of heat has been found to aid the melting and subsequent fusion bonding of the thermoplastic material to the fastener threaded surface. After being heated, fastener 10 is advanced to powder dispensing apparatus 38. Referring to FIGS. 3 and 4, apparatus 38 includes a linear vibratory feeder 40 having an adjustable trough 42 mounted on feeder 40, a powder storage hopper 44 above trough 42 and a return chute (not shown) below conveyor 14 for catching excess powder. Plates 46 and 48 are mounted on either side of trough 42 and are capable of being moved in both directions along the axis of conveyor 14 to increase or decrease the width of trough 42, as can be seen in FIGS. 4A, 4B and 4C. Apparatus 38 is mounted for rotation in a horizontal plane so that the angle between the front edge of trough 42 and the longitudinal axis of conveyor 14 is adjustable. This feature, along with the width adjustability of trough 42, allows careful control of the dimensions and shape of the plastic patch which is formed on fastener 10. The frequency of vibratory feeder 40 is adjustable in order to control the amount of powder deposited on fastener 10. The thermoplastic material which is deposited on threaded shank 12 is stored in fine powder form in hopper 44. The thermoplastic material may be one of a number of materials possessing among its general properties, high tensile strength and elongation when in a solidified state. In the present embodiment Dumont Chemical Co. DURBEL-MA-12 nylon powder is considered suitable for use. The powder falls through opening 50 at the bottom of hopper 44 onto trough 42, which dispenses a controlled amount of powder onto bolt shank 12. At least one full thread at the tip end of fastener 10 should not contain any thermoplastic material, facilitating entry of the fastener into a mating threaded workpiece. Trough 42 is inclined slightly upwardly from back to front toward bolt shank 12 and thus the vibratory action of a high frequency oscillating motor (not shown) causes the powder to advance up the inclined trough and fall due to gravity onto threaded shank 12 of fastener 10 as it passes under trough 42. A shroud or cover 52 is placed over conveyor 14 adjacent apparatus 38 to prevent external air currents from affecting the flow of powder onto bolt shank 12. The powder melts upon contacting threaded shank 12 and thereupon starts to solidify from the surface inwardly toward the root of the thread upon exposure to ambient air as the fastener advances on conveyor 14. Due to the nature of gravity feeding the powder onto threaded shank 12, the thermoplastic material is generally uniformly tapered from a minimum thickness at the edges to a maximum thickness at the center, as can be seen in FIG. 7 (A). In this free form state, the thermoplastic material generally extends an uncontrolled distance above the crests on threaded shank 12. After the powder is deposited, fastener 10 is transported a predetermined distance by conveyor 14 in order to allow the thermoplastic material to solidify at and adjacent the surface. In order to speed the solidification process, a spray pipe 54, which dispenses a water-mist spray, may be placed downstream from apparatus 38, such as by slidingly mounting it on a beam 55, as shown in FIG. 5. It is emphasized that spray pipe 54 is basically an optional feature for the purpose of shortening conveyor 14.

Figure 6:
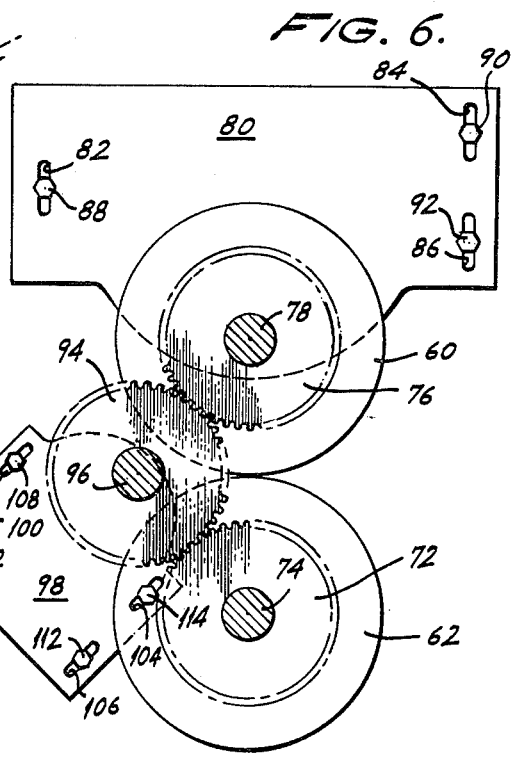
FIG. 6 is an elevation view of the roller adjusting apparatus.

Referring now to FIGS. 5, 6 and 7, there is shown pressure roll patch forming apparatus 56. FIG. 7 shows a progressive advancement of fastener 10 through a pair of rollers where the thermoplastic material is formed into a shaped patch 58. In the first position (A), fastener 10 is shown with the partially solidified plastic patch on threaded shank 12 prior to entering apparatus 56. It should be noted that prior to rolling, the patch material is generally of uneven shape extending an uncontrolled distance above the threads of the fastener, with the thickness of material being greatest proximate the center. Apparatus 56 includes top roller 60 and bottom roller 62. Each roller is a circular disc generally made from metal or a rigid material and is approximately 6⅞" in diameter in the present embodiment. It should be understood that rollers 60 and 62 could be any suitable size for producing sufficient force to properly form patch 58, and may vary with screw size. An annular resilient member 64 is mounted around the circumference of top roller 60 and a similar annular resilient member 66 is mounted around the circumference of bottom roller 62. Resilient members 64 and 66 are each fabricated by laminating a 3/32" thick strip of Cohrlastic 400 silicone sheet rubber on top of a ⅛" thick strip of Cohrlastic R-10470, medium silicone sponge rubber. The sponge rubber provides resiliency to follow the thread form and the sheet rubber provides a smooth, closed pore surface for more uniform patch appearance. Silicone rubber is preferred for its general heat resistant properties. It should be understood that other suitable, generally resilient materials could be used for members 64 and 66 with equally successful results. Rollers 60 and 62 are initially separated by a predetermined fixed distance in order to allow fastener 10 to pass through the rollers without being dislodged from fixtures 16. For example, a typical initial separation of surfaces 68 and 70 of respective members 64 and 66 for a nominal ⅜" I.D. fastener is on the order of 1/32". Rollers 60 and 62 are driven at a rotational speed such that the tangential velocity of surfaces 68 and 70 is approximately equal to the linear speed of conveyor 14. The rotational speed and initial spacing of the rollers can be adjusted by apparatus which will be described hereinafter. As shown in position (B) in FIG. 7, fastener 10 passes between rollers 60 and 62, and surface 68 of top resilient member 64 contacts the upper half of threaded shank 12 producing a generally vertical downward force on the partially solidified thermoplastic material. Surface 70 of bottom resilient member 66 similarly contacts the lower half of threaded shank 12 providing an equal reactive force. Surface 68 first contacts threaded shank 12 proximate one tapered edge of the thermoplastic material and thereupon rolls across the surface exerting radially inward pressure on the material to compact it and force it into the root of the threads and against the surface of shank 12, forming patch 58. The rollers displace excess thermoplastic material above the crests of the threads and compress it into the thread roots and circumferentially along the thread flanks, thus controlling and limiting the height of formed patch 58, as shown in position (C) in FIG. 7. This forming operation imparts a generally rectangular shape to patch 58. It has been found that the radially outermost surface of patch 58 so formed by rollers 60 and 62 does not exceed a value equal to the basic major diameter of the fastener thread. Referring to FIG. 9, the actual diameter of crests 61 of the fastener thread is less than the basic major diameter of the fastener thread. For example, a nominal ⅜-16" bolt has a basic major diameter of 0.375 inches while actual major diameters typically range from approximately 0.366 to 0.368 inches. Pressure rolling of the thermoplastic material reduces the maximum radial extent of surfaces 63 on patch 58 to an envelope which does not exceed the basic major diameter of the fastener thread equal to 0.375 inches. Typical maximum diameters taken at surfaces 63 on a number of nominal ⅜-16" bolts ranged from approximately 0.367 to 0.371 inches. It should be noted that the radial distance from the longitudinal axis of the fastener to surfaces 63 is greater than the corresponding radial distance from that axis to the thread crests at a point diametrically opposite surfaces 63. This point is noted to indicate that the peripheral configuration of the fastener at patch 58 is not completely circular, and therefore the maximum diameters taken at surfaces 63 indicated above are effective diameters for comparison with the basic major diameter. The uniformity of patch dimensions including restricting the patch to a controlled height substantially equal to the envelope of the basic major thread diameter, has been found to produce greater uniformity in prevailing torque test results as well as acceptable prevailing torque values, both upon initial tightening and after the first and fifth removals. This method of testing is an industry-wide standard for measuring the effectiveness of prevailing torque fasteners. The pressure produced by the forming operation creates a more closely packed patch and also forces the molten material into more intimate contact with the heated fastener surface improving patch adhesion. It should be noted that no primer material is applied to the fastener surface, as is disclosed, for example, in the aforementioned patents to Duffy.

Referring to FIG. 6, the adjustment and driving mechanism for rollers 60 and 62 is shown. Bottom roller 62 is shown mounted to a gear 72 by a shaft 74 journaled for rotation in apparatus 56. Top roller 60 is connected to a gear 76 by a shaft 78 journaled for rotation in a plate 80. Plate 80 is movable in a vertical direction with respect to apparatus 56 by means of elongated slots 82, 84 and 86, and adjusting bolts 88, 90 and 92, respectively. By adjusting the vertical position of plate 80, the desired amount of initial separation between surfaces 68 and 70 of resilient members 64 and 66 can be obtained. It should be understood that bottom roller 62 could be similarly vertically adjustable for finer control and adjustment of the initial separation. The initial separation of members 64 and 66 for a ⅜-16" bolt, for example, should ideally be adjusted so that when the bolt passes between them, members 64 and 66 are each compressed to a thickness of approximately 1/16" to 3/32". The amount of initial separation of members 64 and 66 will vary with bolt size, but ultimate compression of the members to the above-noted range of thicknesses will produce acceptable results for all bolt sizes. A driving gear 94 is mounted to a variable speed motor (not shown) by a shaft 96 journaled for rotation in a plate 98 having slots 100, 102, 104 and 106 formed therein. The speed of the motor is adjusted to drive rollers 60 and 62 at the proper tangential speed to match the linear velocity of conveyor 14. Adjusting bolts 108, 110, 112 and 114 cooperate with the slots to allow linear movement of plate 98. Gear 94 is formed to mesh with gears 72 and 76, respectively, to drive rollers 60 and 62. When plate 80 is moved vertically, changing the vertical separation of surfaces 68 and 70, plate 98 containing driving gear 94 must be moved into engagement with gears 72 and 76.

Referring again to FIG. 1, after fastener 10 passes through rollers 60 and 62 it is transported by conveyor 14 to the underside where it is forced off of magnetic fixtures 16 by an appropriate apparatus, such as a stationary wiper (not shown), and falls into a quench tank 116 where it is cooled.

Having thus described the present invention, some of the many advantages should now be readily apparent. The apparatus and method disclosed affords a relatively simple and economical means for producing self-locking fasteners of the type having a thermoplastic resin patch formed on the thread surface. Pressure rolling produces controlled uniform patch dimensions from fastener to fastener including patch height, thus insuring uniform performance characteristics. Greater predictability and uniformity of prevailing torque test results, in accordance with customary industry standards, are obtained with fasteners made in the disclosed manner. In addition, the pressure rolling step insures greater adhesion of the thermoplastic patch material to the threaded shank portion of the fastener, thus insuring fewer break-away type of patch failures. Contamination of the surrounding environment is also minimized because there is no loose or excess material on the formed patch which can be sheared off by the mating thread.

Obviously, many modifications and variations of the present invention are possible in light of the above teachings. It is therefore to be understood that within the scope of the appended claims the invention may be practiced otherwise than as specifically described.

What is claimed is:

1. Apparatus for making a self-locking, externally threaded fastener of the type having a resilient, deformable patch of thermoplastic resin material fusion bonded to the thread surface, comprising:

means for supporting said fastener in a position with its longitudinal axis approximately horizontal;

means for heating said external thread surface to a temperature at least equal to the melting temperature of said thermoplastic resin material;

means for depositing said thermoplastic resin material in powder form on said heated external thread surface over a preselected circumferential extent less than 180° in an amount sufficient that the resin material extends above some portion of the fastener thread crests whereby said thermoplastic resin material is fusion bonded to said external thread surface; and means for applying rolling pressure to said thermoplastic resin material to form said patch and to displace the excess resin material above the thread crests into the root areas of the threads to control and limit the radial height of the patch above the thread crests within the normal envelope of the basic major diameter of the fastener thread, including a pair of rollers each having a circumferential surface juxtaposed one from the other, whereby the fastener is passed between said rollers and the thermoplastic material is rollingly contacted on the external surface thereof by one of said circumferential surfaces.

2. Apparatus in accordance with claim 1 wherein said one circumferential surface is resilient.

3. Apparatus in accordance with claim 1 wherein said heating means heats the fastener external thread surface to between approximately 475° F. to 525° F.

4. Apparatus in accordance with claim 1 wherein said heating means heats the fastener to its core prior to said depositing means depositing said thermoplastic resin material on said heated external thread surface, whereby the internally heated metal acts as a heat reservoir to aid in the melting and fusion bonding of said thermoplastic resin material to the fastener external thread surface.

5. Apparatus in accordance with claim 1 wherein said thermoplastic resin material is in a partially solidified state at and adjacent the surface thereof prior to said means for applying rolling pressure acting thereupon.

* * * * *